(12) United States Patent
Russell

(10) Patent No.: US 9,562,174 B2
(45) Date of Patent: Feb. 7, 2017

(54) ADHESIVE MEMBRANE

(75) Inventor: Andrew Russell, Sydney (AU)

(73) Assignee: A. Proctor Group Limited (GB)

( * ) Notice: Subject to any disclaimer, the term of this patent is extended or adjusted under 35 U.S.C. 154(b) by 1048 days.

(21) Appl. No.: 12/937,823

(22) PCT Filed: Apr. 14, 2009

(86) PCT No.: PCT/GB2009/000962
§ 371 (c)(1),
(2), (4) Date: Apr. 15, 2011

(87) PCT Pub. No.: WO2009/127819
PCT Pub. Date: Oct. 22, 2009

(65) Prior Publication Data
US 2011/0185666 A1    Aug. 4, 2011

(30) Foreign Application Priority Data

Apr. 14, 2008 (GB) .................... 0806731.6

(51) Int. Cl.
B32B 7/12 (2006.01)
C09J 7/02 (2006.01)
(Continued)

(52) U.S. Cl.
CPC .............. *C09J 7/0296* (2013.01); *B32B 3/266* (2013.01); *B32B 5/022* (2013.01); *B32B 5/024* (2013.01); *B32B 7/06* (2013.01); *B32B 7/12* (2013.01); *B32B 23/06* (2013.01); *B32B 23/08* (2013.01); *B32B 27/08* (2013.01); *B32B 27/10* (2013.01); *B32B 27/12* (2013.01); *B32B 27/18* (2013.01); *B32B 27/32* (2013.01); *B32B 27/36* (2013.01); *B32B 27/40* (2013.01); *B32B 29/02* (2013.01); *C09J 7/0207* (2013.01); *E04D 12/002* (2013.01); *B32B 2255/10* (2013.01);
(Continued)

(58) Field of Classification Search
CPC ...................................................... E04D 12/00
See application file for complete search history.

(56) References Cited

U.S. PATENT DOCUMENTS

RE24,906 E    12/1960 Ulrich
3,389,827 A    6/1968 Abere et al.
(Continued)

FOREIGN PATENT DOCUMENTS

EP    0306818 A2 *  3/1989 ............... D06N 7/00
EP    0397554 B1    3/1994
(Continued)

OTHER PUBLICATIONS

"Hardening Organic Polymer, Process for Producing the Same, and Hardening Composition Containing the Polymer", machine translation of WO2008053875A1 from Espacenet. Aug. 5, 2008.*
(Continued)

*Primary Examiner* — Anish Desai
(74) *Attorney, Agent, or Firm* — Dinsmore & Shohl LLP

(57) ABSTRACT

A self-adhesive permeable membrane sheet (1), for use in a building structure, includes a continuous layer of a permeable pressure sensitive adhesive (8) attached to one surface of a permeable membrane sheet (2,4,6). Methods for using the permeable membrane sheet (1) in construction are also provided.

4 Claims, 1 Drawing Sheet

(51) Int. Cl.

| | | |
|---|---|---|
| *B32B 27/12* | (2006.01) | |
| *E04D 12/00* | (2006.01) | |
| *B32B 5/02* | (2006.01) | |
| *B32B 7/06* | (2006.01) | |
| *B32B 23/06* | (2006.01) | |
| *B32B 23/08* | (2006.01) | |
| *B32B 27/08* | (2006.01) | |
| *B32B 27/10* | (2006.01) | |
| *B32B 27/18* | (2006.01) | |
| *B32B 27/32* | (2006.01) | |
| *B32B 27/36* | (2006.01) | |
| *B32B 27/40* | (2006.01) | |
| *B32B 29/02* | (2006.01) | |
| *B32B 3/26* | (2006.01) | |
| *E04B 1/62* | (2006.01) | |

(52) U.S. Cl.
CPC ....... *B32B 2255/12* (2013.01); *B32B 2255/26* (2013.01); *B32B 2307/51* (2013.01); *B32B 2307/71* (2013.01); *B32B 2307/712* (2013.01); *B32B 2307/724* (2013.01); *B32B 2307/726* (2013.01); *B32B 2307/7246* (2013.01); *B32B 2307/748* (2013.01); *B32B 2419/00* (2013.01); *B32B 2419/06* (2013.01); *B32B 2607/02* (2013.01); *C09J 2400/263* (2013.01); *C09J 2433/00* (2013.01); *E04B 1/625* (2013.01); *Y10T 428/24322* (2015.01); *Y10T 428/249921* (2015.04); *Y10T 428/249978* (2015.04); *Y10T 428/249981* (2015.04); *Y10T 442/30* (2015.04); *Y10T 442/60* (2015.04); *Y10T 442/66* (2015.04)

(56) References Cited

U.S. PATENT DOCUMENTS

| | | | | |
|---|---|---|---|---|
| 3,645,835 | A | * | 2/1972 | Hodgson .................. 428/195.1 |
| 4,112,213 | A | | 9/1978 | Waldman |
| 4,226,915 | A | * | 10/1980 | Iijima et al. ................. 428/492 |
| 4,421,807 | A | | 12/1983 | Clausing et al. |
| 4,863,788 | A | | 9/1989 | Bellairs et al. |
| RE33,353 | E | | 9/1990 | Heinecke |
| 5,147,698 | A | * | 9/1992 | Cole ............................ 428/41.3 |
| 5,169,712 | A | * | 12/1992 | Tapp .......................... 428/315.5 |
| 5,198,064 | A | * | 3/1993 | Tani et al. ..................... 156/289 |
| 5,374,477 | A | | 12/1994 | Lawless et al. |
| 5,560,974 | A | * | 10/1996 | Langley ........................ 428/198 |
| 5,593,771 | A | | 1/1997 | Lawless et al. |
| 5,881,521 | A | | 3/1999 | Porter et al. |
| 5,993,927 | A | * | 11/1999 | Sugita ................... C09J 7/0246 428/323 |
| 6,207,766 | B1 | * | 3/2001 | Doi et al. ...................... 525/403 |
| 6,901,712 | B2 | | 6/2005 | Lionel |
| 2001/0037006 | A1 | | 11/2001 | Holguin |
| 2002/0055316 | A1 | * | 5/2002 | Araida et al. ................. 442/382 |
| 2002/0106959 | A1 | * | 8/2002 | Huffines et al. .............. 442/394 |
| 2004/0103608 | A1 | | 6/2004 | Lionel |
| 2004/0180195 | A1 | * | 9/2004 | Macuga ........................ 428/343 |
| 2006/0260265 | A1 | * | 11/2006 | Zatkulak ..................... 52/745.06 |
| 2007/0212520 | A1 | * | 9/2007 | Furumori et al. ............. 428/134 |
| 2009/0247712 | A1 | * | 10/2009 | Tanaka et al. ................. 525/451 |

FOREIGN PATENT DOCUMENTS

| | | | | |
|---|---|---|---|---|
| GB | 2473618 A | * | 3/2011 | ............. C09J 11/00 |
| WO | WO01/42384 A2 | | 6/2001 | |
| WO | WO2004/082932 A1 | | 9/2004 | |
| WO | WO2004/185666 A1 | | 9/2004 | |
| WO | WO 2005/105429 A1 | | 11/2005 | |
| WO | WO 2008053875 A1 | * | 5/2008 | ........... C08G 65/336 |

OTHER PUBLICATIONS

"Understanding Housewraps: A Decision Guide for Selecting the Right Housewrap" from Benjamin Obdyke, printed May 2012.*
Data sheet of a product name "WrapShield" (trade name) from VaproShield LLC, Jan. 2007.*
International Search Report from WIPO, International Publication No. WO 2009/127819, International Application No. PCT/GB2009/000962, International Filing Date Apr. 14, 2009, date of actual completion of the International Search, Jul. 22, 2009, 4 pages.
Agency for Toxic Substances and Disease Registry (ATSDR). Public Health Statement Propylene Glycol CAS#: 57-55-6. Sep. 1997. U.S. Department of Health and Human Services, Public Health Service.. http://www.atsdr.cdc.gov/toxprofiles/tp189-c1-b.pdf. Accessed via Internet May 21, 2015.
Rufco-Wrap. http://ravenefd.com/files1801312520/0016/WrapItUp.pdf. Accessed via Internet May 21, 2015.

* cited by examiner

ADHESIVE MEMBRANE

FIELD OF THE INVENTION

The present invention relates to water vapour and air permeable sheet materials employed in building construction, especially those employed in wall and roofing applications to control the movement of water vapour and air.

BACKGROUND TO THE INVENTION

Modern building structures often make use of barrier membrane sheet materials to control the flow of moisture in and out of a building and also to control the ventilation or movement of air through a wall or roof structure for example.

Typical membrane products are designed to be weather resistant, keeping out liquid water and resisting wind pressure. At the same time however it is highly desirable that the membrane be formed so that water vapour may pass through relatively freely to avoid problems of dampness or condensation within a building or within a wall or roof structure. A number of water vapour permeable membrane products are available and combine weather resistance with water vapour permeability. One type of product, incorporating macroporous film technology, has small pores which allow diffusion of water molecules, driven by vapour pressure differential, from one side of the membrane sheet to the other (generally from inside the structure to out). Membranes which allow passage of water vapour but not air are generally referred to as vapour permeable air barriers.

For some applications a membrane sheet that allows passage of air as well as of water vapour is desirable.

An air permeable membrane allows controlled ventilation and is at the same time highly vapour permeable. Water vapour is readily transported by air movements through the membrane.

Air barrier and air permeable weather resistant membrane sheets find use in a wide range of applications. For example in forming a building 'envelope' underneath exterior cladding or roofing material which resists liquid water (rain) but which allows escape of water vapour or trapped moisture from inside the structure.

Building regulations vary from one country to another and the types of membrane used are often dictated by the climate and by local building requirements. In Canada for example, the use of membranes which provide an air barrier are mandated.

Typical membrane sheeting is attached to a wall or roof structure, (for example, sheathing panels of a wall structure) by means of mechanical fasteners such screws or nails or by use of an adhesive for example a bitumen-based adhesive, which is not air or water vapour permeable. These methods have certain disadvantages however. With mechanical fasteners attachment is discontinuous and is only at points where the fixings connect the membrane sheeting to the rest of the structure. This leads to the possibility of air or water passing along underneath the membrane sheet reducing control of the ventilation and humidity. Furthermore mechanical fixings which puncture the membrane (nails or screws) reduce the integrity of the envelope and can provide opportunities for tearing the membrane; during installation; or when the installed membrane is subjected to high air pressures during bad weather. Where an adhesive such as a bitumen-based adhesive is employed the area covered by the adhesive does not permit transmission of water vapour or air. Furthermore a primer is often required to securely attach such adhesives to substrates.

Some of these problems are addressed in U.S. Pat. No. 6,901,712, which provides an air barrier (water vapour permeable) membrane which has a discontinuous adhesive layer attached to one surface. The discontinuous adhesive layer is used to stick the membrane to panels or sheathing substrates of a wall or roof structure without mechanical fixings being required. Self adhesive membrane systems are commonly described as 'peel and stick' systems. However the adhesive employed in the discontinuous layer is not itself air or water vapour permeable. This limits the water permeability of the membrane sheet to those parts of the sheet without attached adhesive.

It is an object of the present invention to avoid or reduce one or more of the foregoing disadvantages.

DESCRIPTION OF THE INVENTION

According to a first aspect the present invention provides a self-adhesive permeable membrane sheet, for use in a building structure, comprising a continuous layer of a permeable pressure sensitive adhesive attached to one surface of a permeable membrane sheet.

The self-adhesive permeable membrane sheet may be water vapour permeable or both air and water vapour permeable as described in more detail below.

Providing a continuous layer of a permeable pressure sensitive adhesive on one side of the membrane sheet has a number of advantages over other prior membrane arrangements. The continuous layer of adhesive allows strong adhesion to components of a wall or roof construction, for example. The adhesive contact between the membrane sheet and the structure it touches is continuous at every point of contact. Therefore, for example, when the membrane sheet is attached to a panel of a wall structure there are no passages or channels between the membrane sheet and the panel, which could allow air or moisture leakage to occur. Furthermore when a building structure is subject to wind pressure, the membrane sheet, by virtue of the continuous bonding to the structure is less liable to be lifted from or blown away from its intended location.

The membrane sheet of the invention does not require fixings such as nails, which penetrate the membrane, which can give rise to pathways for water or air leakage. Nails or similar fixings can lead to the risk of tearing of the membrane sheet and consequent significant loss of the membrane's integrity.

A further advantage is that, as the adhesive layer is continuous the permeability properties of the membrane sheet are consistent across its entire area. This is not the case with a membrane sheet having a non-continuous adhesive layer especially where the adhesive layer is non-permeable. For example, if a non-continuous adhesive layer is not water vapour permeable then condensation may form locally, at the areas of the membrane sheet having adhesive attached, especially if the membrane sheet is located in a structure (e.g. a wall) at a point where the air can be at or near dew point conditions.

During construction, the consistent (across all of its surface) high water vapour permeability of membrane sheets of the invention is particularly advantageous. Building can continue even when parts of the structure, for example its walls, are wet. Internal moisture in or on the wall materials will dissipate through the membrane sheets allowing full drying out of the walls and structure to occur even after completion.

It will be understood that the membrane sheet may be selected to be either only water vapour permeable (an air barrier) or both air and water vapour permeable. Similarly the permeable continuous adhesive layer may be selected to complement the properties of the membrane material and can be water vapour permeable or air and water vapour permeable. It has been found that the continuous adhesive layer minimally reduces the permeability characteristics of the membrane material and provides significantly enhanced performance when compared to existing arrangements.

It is generally preferred that the adhesive layer is selected to be both air and water vapour permeable i.e. it has a relatively high ability to pass water vapour therethrough. This allows adjustment of the overall permeability characteristics of the membrane sheet to be selected by choice of materials and construction of the membrane sheet itself.

Suitable permeable adhesives include those made by the processes of EP 0397554 which describes methods of manufacture of air and water vapour permeable adhesive tapes for medical applications. These adhesives comprise a natural or synthetic rubber and/or acrylic pressure sensitive adhesive, a polyfunctional isocyanate compound and hydrophobic inorganic fine particles. The particles may be silica, alumina or titania for example. Other permeable adhesives with suitable strength for construction applications may be employed. For example adhesives based on polyurethane and silicone can be provided with air and or water vapour permeability. Foamed adhesives or adhesives including swellable polymer additives with suitable water vapour permeability or air and water vapour permeability may also be employed. A foamed adhesive layer may be beneficial in providing a relatively thicker layer of adhesive that can conform to a relatively uneven substrate in use.

Acrylic based adhesives have the advantages of excellent environmental resistance, fast setting times and high strength bonding. They can be used without the need for surface preparation, which can be required when using other types of adhesive.

The preferred adhesives, when applied to permeable membranes for use in building and construction applications, have surprisingly been found to result in products that are suitable for demanding applications in the construction industry. Preferably an adhesive layer with a vapour permeability of more than 6 perms (35 g/m$^2$/24 hrs) is employed. More preferably an adhesive layer with a water vapour permeability of more than 30 perms is employed. Most preferably an adhesive layer with a vapour permeability of 40 perms or more is employed. However it will be understood that any permeability of the adhesive layer can be selected to suit the particular application intended. A permeability of any level from 2 perms upwards may be employed depending on the circumstances.

Adhesives of the types described in EP0397554 can be used to form an adhesive layer with a water vapour permeability of 50 perms or more. A 50 perm breathability is comparable with that of certain existing vapour permeable membrane products (that do not have an adhesive layer), for example the 'WrapShield'® products from the A Proctor Group discussed further below. Furthermore in use permeable membrane sheets coated with adhesives of these types have been found to bond successfully with a substrate (for example gypsum wall board, oriented strand board (OSB), plywood, concrete, stainless steel or vinyl) without requiring application of a primer. Typical primers employed with prior art sheets, including those with a discontinuous adhesive layer reduce the water vapour permeability of the system to 8-10 perms i.e. just within the acceptable range for classification as 'breathable.' Therefore using an adhesive layer that does not require a primed surface to bond to and has itself a permeability of 50 perms or more allows permeable membrane sheets to be constructed with substantially more water vapour permeability than found in known adhesive membrane sheets. Furthermore the installation costs are reduced when a primer is not required.

Preferred adhesive compositions include mixtures comprising the following four components:
1. An acrylic pressure sensitive adhesive (base compound).
2. An air permeable agent (including a water absorbent resin, polypropylene glycol and water).
3. A cross-linking agent.
4. An additive such as polyoxypropylene glycol or a tackifier (a xylene resin).

Other additives may be included in the mixture to improve or modify the permeability or other properties of the self-adhesive permeable membrane.

Preferred examples of these compositions include as the components 1 to 4 (available from VIGteQnos Co Ltd of Japan) by weight:
1. AR-2412 Two component cross linked acrylic pressure sensitive adhesive.
   Acrylic ester copolymer (39%)
   Hydrogenated rhodine ester resin (10%)
   Acetic ether (ethyl acetate) (50%),
   Vinyl acetate (1%)
2. AR-739M Air permeable agent.
   Water-absorbent resin (1%)
   Polypropylene glycol (1%)
   Water (98%)
3. HD-739D Cross linking agent
   Modified polyisocyanate (20-25%)
   Silicon dioxide (5-10%)
   Toluene (50-55%)
   Acetic ether (ethyl acetate)(15-20%)
4. Tackifier (A xylene resin which improves the initial and extended tackiness of the adhesive film); or PP-4000 Polyoxypropylene glycol (100%).

The ratio of these components by weight to each other may be in the range of:
AR-2412 100: AR-739M 10 to 40: HD-739D 1 to 5: PP-4000 or tackifier 1 to 5.

Compositions having these ratios of composition have high adhesive strength. Particularly preferred adhesive compositions are described hereafter as Examples. These types of acrylic based permeable adhesive compositions operate by virtue of incompatibilities between the components. These result in a continuous layer of adhesive which has tortuous air permeable paths through the body of the layer which provide the permeability.

The materials and construction of the membrane are chosen for the application and duty required. Commercially available sheeting may be employed, with the adhesive layer applied, for example, by the methods described in EP0397554. Typically the adhesive mixture is applied to a release paper and then dried by hot air to give a coating of for example, 90 microns thickness. It will be understood by the skilled person that compositions are described in this application on the basis of their content before such a drying step or a curing step.

The adhesive/release paper laminate is then adhered to the membrane sheeting. Other thicknesses of adhesive coating may be employed, for example 50 microns or 70 microns. Generally speaking an adhesive coating of from 30 to 100 microns may be employed.

Alternative methods may be employed to manufacture the membranes of the invention. For example a permeable membrane sheet or film may be extruded onto a layer of the permeable pressure sensitive adhesive.

The membrane sheet material may be microporous, monolithic, microperforated or some other type of vapour permeable sheet or film. The membrane may comprise any form of polyolefin sheeting, such as a polyethylene or polypropylene for example. Other plastics materials may be employed. A paper based permeable membrane may be used in some applications. The membrane may also be coated, for example spray coated with other polymeric coatings. The membrane may include a heat reflective coating or layer to improve its thermal insulation properties. The membrane may include additives to improve performance such as acrylics or additives to impart UV resistance.

Composite or laminate sheeting comprising more than one layer of materials may also be employed. Preferred membranes employed in the invention include laminated wall and roof construction membranes. For example the vapour permeable 'WrapShield'® products from the A. Proctor Group or their US distributors; VaproShield LLC of Gig Harbour Wash. These products incorporate three layers of polypropylene (spunbond, microporous film and spunbond) to produce a tough durable and breathable (50 perms) product. Suitable water vapour and air permeable products include, for example, the WallShield® and RoofShield® products available from the A. Proctor Group which can have a water vapour permeability in excess of 200 perms. These products have a laminated construction of polypropylene (spunbond, meltblown and spunbond), which provides air and water vapour permeability in combination with good resistance to water in a liquid state i.e. rain. Combining such high perm membrane materials with a high perm adhesive layer allows a 'peel and stick' product to be manufactured which can be used where both water vapour and air permeability are required.

Other types of permeable membranes, which may be used in the invention, include permeable cast monolithic films such as polyurethane or co-polyester films for example. Permeable monolithic films "breathe" by an absorption-diffusion-desorption model.

Firstly, water vapor is absorbed on the side with the highest relative humidity by the hygroscopic film or coating. The absorbed water molecules then diffuse through the bulk of the hygroscopic material and are consequently desorbed on the side with the lowest relative humidity (RH). The driving force for the diffusion is the difference in partial pressure or concentration gradient of water molecules across the film surface. The water molecules thus evaporate from the surface into the atmosphere with the lowest RH.

Yet further types of membranes that may be employed include laminates where a film coating is extruded onto a suitable substrate, which may itself be a microporous film or a fibrous layer, for example.

Where laminated sheets are employed they may comprise woven or non woven fibre layers, elastic fabrics, cellulosic materials and Bio-resins.

The self-adhesive permeable membrane sheets of the invention have a continuous layer of a permeable pressure sensitive adhesive attached to one surface of the permeable membrane sheet.

Conveniently, for some applications, both surfaces of the permeable membrane sheet are supplied with a continuous layer of a permeable pressure sensitive adhesive. A sheet having permeable adhesive on both sides can be used, for example, in the production of composite sheets with high performance insulation. One side of the membrane sheet is adhered to a thin high performance insulation layer to give a composite product that can be used to reduce thermal bridging in building envelopes and contribute to the overall performance of a building system.

The composite product is readily fixed in place on a structure by making use of the continuous layer of permeable adhesive on the side of the membrane sheet opposite the side carrying the insulation layer. Examples of suitable high performance insulation materials suitable for use in this application include polyurethane (PU) or polyisocyanurate (PIR) foams, phenolic foams, extruded and expanded polystyrenes or silica aerogel materials The self-adhesive membrane sheets of the invention are conveniently supplied with a backing of a release paper, which covers the adhesive layer or layers before use. The release paper may be paper based, PET based or siliconized for example. The membrane sheets may be supplied in any size. Conveniently the membrane sheet may be supplied for use in the form of a roll. For use in constructions where full coverage of walls or roofs with the membrane sheeting is required a sheet of 1.5 m by 25 m, provided as a roll, is particularly convenient in use. The sheets are then unrolled, cut to size and the release paper removed prior to application to a surface, such as wall sheathing or roofing panels, which is to be covered i.e. a peel and stick process.

Thus according to a second aspect the present invention provides use as a building material of a self-adhesive permeable membrane sheet comprising a continuous layer of a permeable pressure sensitive adhesive attached to one surface of a permeable membrane sheet.

According to a third aspect the present invention provides a wall or roofing construction comprising a self-adhesive permeable membrane sheet wherein the permeable membrane sheet comprises a continuous layer of a permeable pressure sensitive adhesive attached to one surface of a permeable membrane sheet.

According to a fourth aspect the present invention provides a method of controlling the flow of air and moisture through a wall, roof or window structure comprising the steps of:

providing a self-adhesive permeable membrane sheet wherein the self-adhesive permeable membrane sheet comprises a continuous layer of a permeable pressure sensitive adhesive attached to one surface of a permeable membrane sheet; and adhering said self-adhesive permeable membrane sheet to a wall or roof structure by means of the continuous layer of a permeable pressure sensitive adhesive.

The self-adhesive permeable membrane sheets of the invention can be used in a wide range of applications in construction. For example they may be used underneath exterior wall and roof cladding of a building to provide a complete envelope of permeable membrane as is commonly done with conventional membrane sheeting. The combination of easy but secure fixing by 'peel and stick' and the ability to select the degree of permeability of the membrane sheets of the invention makes their use at particularly awkward or vulnerable locations in a structure advantageous. As mechanical fixings such as nails or screws are not required there is no loss of integrity caused by puncturing the sheet, which could allow leakage of liquid water. For example the membrane sheets of the invention can be used in the form of strips around the edges of doors and windows to bridge between the door or window frame material and the wall panel materials (a "window flashing" system). Similarly the membrane sheets can be used across expansion joints in a structure to seal them against liquid water whilst still allowing water vapour and (optionally) air to pass through. In some applications the membrane sheet may be applied across an expansion gap with a fold present in the sheet (a "movement fold") to allow for significant expansion, without tearing the sheet. In such cases the area of membrane sheet containing the movement fold may be supplied without the layer of adhesive to allow free movement in use.

When used to bridge between different components of a structure, as a "transition membrane" the membrane sheet portions may conveniently be pre-formed into an appropriate shape, for example to fit into and around the corner of a window frame to make fitting easier and more accurate. For example the membrane sheets of the invention can readily be cut and joined, by ultrasonic welding for example, to form a one piece 3-D suitable shape for close fitting into a window frame corner. Alternatively, for many bridging or joining applications the permeable membrane sheets may simply be provided in the form of a tape (i.e. a long continuous thin strip).

Whilst the present invention has been described in terms of permeable membrane sheets for use in the construction industry it will be appreciated that the membrane sheets of the invention can find use in other applications.

The membrane sheets can be applied ("peel and stick") to other materials such as a cloth to provide a breathable yet waterproof laminate. By virtue of the continuous layer of permeable adhesive the laminate is easily yet strongly and consistently bonded together to give a laminate that can be readily fashioned into articles, without risk of separation occurring between the layers.

BRIEF DESCRIPTION OF THE DRAWINGS

Further preferred features and advantages of the present invention will appear from the following detailed description of embodiments illustrated with reference to the accompanying drawing in which.

DESCRIPTION OF SOME PREFERRED EMBODIMENTS AND EXPERIMENTAL RESULTS

Figure 1:
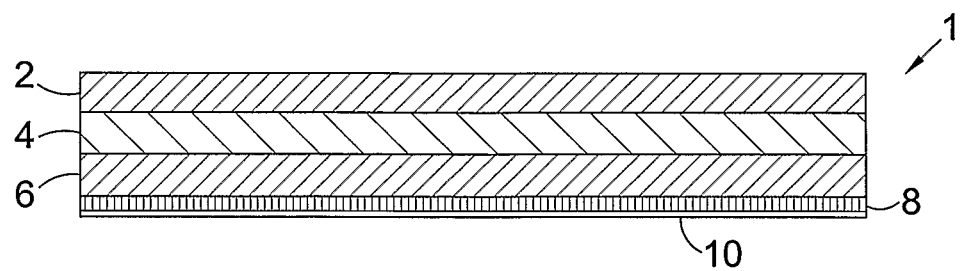
FIG. 1 shows in schematic cross section a self-adhesive permeable membrane sheet of the invention.

FIG. 1 shows schematically in cross section a self-adhesive permeable membrane sheet 1 of the invention. The sheet 1 consists of three layers 2, 4, 6 of spunbond polypropylene 2, meltblown polyester 4 and spunbond polypropylene 6. A layer of a permeable pressure sensitive adhesive 8 has been applied over all of one surface of the sheet 1. A silicone release paper 10 protects the adhesive layer 8 before use.

Figure 2:
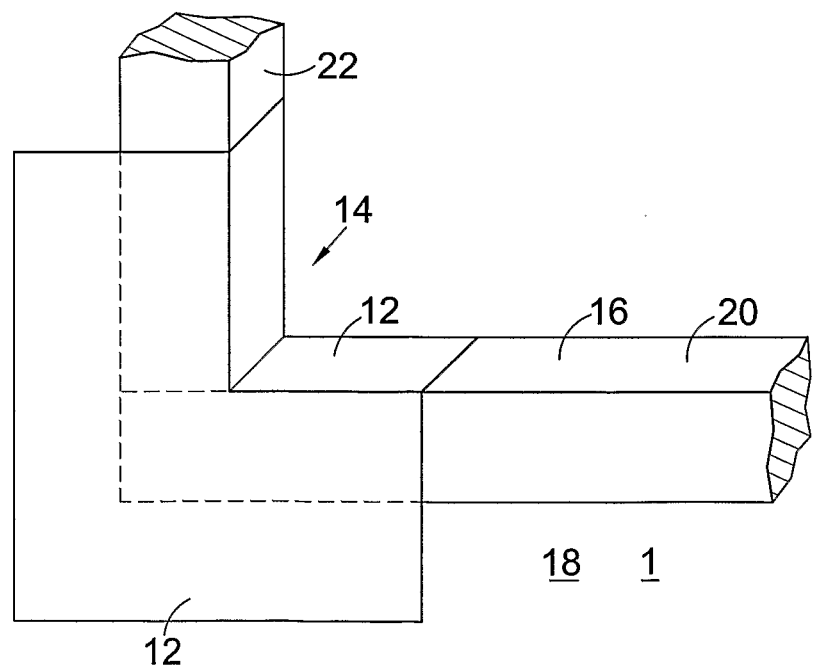
FIG. 2 shows the application of a shaped portion of the self-adhesive membrane sheet of FIG. 1 as a transition membrane at the corner of a window frame.

FIG. 2 shows schematically a portion of the self-adhesive permeable membrane sheet of FIG. 1 that has been formed into a one piece 3-D corner piece 12 and applied to the corner 14 of a window frame 16 to bridge between the frame 16 and a wall panel 18 which itself is covered with a sheet 1 of the invention. The corner piece 12 ensures continuity of the permeable barrier from the wall panel onto the window frame 16. The rest of the window frame structure 20,22 can be similarly covered by strips of membrane. As an alternative the corner piece 12 and other transition membrane pieces may be fitted first and the sheet 1 applied to the wall panel 18 second to overlap the transition membrane pieces.

Test Results

Preliminary tests for water vapour permeability were carried out using two commercially available membrane products "RoofShield®" and "WrapShield®." Samples were tested according to Japanese Industrial Standard (JIS) L1099(A-1 method) Vapour Permeability (Dry Cup). The test involves measuring the weight gain in a cup containing anhydrous calcium chloride placed in a chamber in this case at ambient atmosphere of 40±2° C., 90±5% relative humidity. An air velocity of 0.8 m/s is applied across the surface of the test piece. The weight gain in the cup over time measures the diffusion of vapour through a test sample of membrane, which seals the top of the cup.

Samples were tested both with and without a layer of permeable adhesive.

Example 1

The adhesive was prepared as a mixture of the following components, 1 to 4, (Available from VIGteQnos Co Ltd of Japan) in the ratio 100:40:2:3 by weight.

1. AR-2412 Two component cross linked acrylic pressure sensitive adhesive.
   Acrylic ester copolymer (39%)
   Hydrogenerated rhodine ester resin (10%)
   Acetic ether (ethyl acetate) (50%)
   Vinyl acetate (1%)
2. AR-739M.
   Water-absorbent resin (1%)
   Polypropylene glycol (1%)
   Water (98%)
3. HD-739D
   Modified polyisocyanate (20-25%)
   Silicon dioxide (5-10%)
   Toluene (50-55%)
   Acetic ether (ethyl acetate)(15-20%)
4. Tackifier (A xylene resin which improves the initial and extended tackiness of the adhesive film).

This mixture was applied to a release paper, dried and then adhered to the one side of the membranes.

The thickness of the permeable layer was 90 microns.

The results are shown in Table 1 below which shows that with the adhesive layer applied both membrane products retained more than 70% of their permeability.

TABLE 1

| | DRY CUP TESTS | | | |
|---|---|---|---|---|
| | RoofShield ® | | WrapShield ® | |
| | No Adhesive | With Adhesive | No Adhesive | With Adhesive |
| Permeability (g/m$^2$/24 h) | 9249.6 | 6648 | 5392 | 4024 |

Similar testing but using a wet cup method based on ASTM E96 was carried out to compare the sheets with and without the permeable adhesive, when used to cover a 12 mm thick glass fibre reinforced gypsum board substrate. (A typical panel used in wall constructions). Results are shown in Table 2. Wet cup testing involves measuring the loss of water from a cup through a covering of a sample under controlled conditions.

TABLE 2

| | RoofShield® | | WrapShield® | |
|---|---|---|---|---|
| | No Adhesive | With Adhesive | No Adhesive | With Adhesive |
| Permeability (g/m²/24 h) | 212 | 145 | 194 | 158 |

Average results from a low number of tests are given in Table 2. Individual results showed significant variation due to the known tendency of the gypsum substrate to exhibit variable properties. Nevertheless the results show that with a suitable continuous layer of a permeable adhesive a gypsum boarding can be covered and protected with a self adhesive membrane sheet and still retain effective water vapour permeability. (The gypsum boarding itself showed a permeability of 197 g/m²/24 h in the wet cup test).

Adhesive strength tests, at −10° C. and 60° C., were also carried out on samples of the membrane sheets adhered to 12 mm gypsum board. The test employed was the Japanese standard JIS Z0237 (90 degree peel adhesion test). There was no adverse effect on adhesion when adhered to gypsum board at these conditions. At these conditions the vapour permeability of un-adhered samples was not adversely affected over a test period of up to 4 weeks.

Air permeability of RoofShield® adhesive coated membrane samples was measured using a method according to Japanese Industrial Standard JIS P8117 (B Method Gurley Test). Tests on the WrapShield® adhesive coated samples is not meaningful as WrapShield® is an air barrier material. The test measures the time for 300 ml of air to pass through a sample under specific pressure conditions i.e. a low time indicates high air permeability. For example air barrier WrapShield® based samples have a test time of 100-200 seconds depending on the sample tested. A RoofShield® based sample gave a test time of 2.33 seconds demonstrating high air permeability. Stability testing at −10° C. and 60° C. over 4 weeks indicated a very slight reduction in air permeability after storage at −10° C. and a slight increase after storage at 60° C. However the variations observed lie within the known (i.e. expected) variations in the properties of the membrane materials, therefore no conclusion can be drawn from these apparent changes.

The peel adhesion of permeable membrane layers using the adhesive of example 1 applied to Wrapshield® and RoofShield® type membranes was tested using a test normally applied to elastomeric joint sealants for roof underlayments. "The peel adhesion performance of self-adhered products AC188 (Acceptance Criteria for Roof Underlayments)" which references ASTM C794-06 (Standard Test Method for Adhesion in Peel of Elastomeric Joint Sealants). This is a 180 degree peel test conducted at a rate of 2 inches/minute. Samples do not require to be rolled.

Results of the peel tests for samples of membranes of the invention adhered to plywood, oriented strand board (OSB) and concrete are given in Table 3 below.

TABLE 3

| | peel tests Average Peel Load (plf) | | |
|---|---|---|---|
| SUBSTRATE | Plywood | OSB | Concrete |
| AVERAGE | 43.03 | 22.58 | 16.58 |
| CRITERIA | ≥12.0 plf | ≥12.0 plf | ≥12.0 plf |

Further peel tests were carried out in accordance with "AAMA 711-05 (Voluntary Specification for Self Adhering Flashing Used for Installation of Exterior Wall Fenestration Products)" which requires an adhesion level of 0.26 N/mm or above to ASTM D3330 (Standard Test Method for Peel Adhesion of Pressure Sensitive Tape), Method F. This is a 90 degree peel test carried out at 12 inches per minute and samples are rolled at a speed of 10 mm/s.

Results are shown in Table 4 below for samples of membranes of the invention adhered to plywood, oriented strand board (OSB), aluminium, vinyl, DensGlas™ (gypsum and fibreglass sheathing) and concrete.

TABLE 4

| | Peel tests Average Peel Load (N/mm) | | | | | |
|---|---|---|---|---|---|---|
| | SUBSTRATE | | | | | |
| | Plywood | OSB | Aluminium | Vinyl | DensGlas | Concrete |
| AVERAGE | 0.51 | 0.27 | 0.30 | 0.58 | 0.55 | 0.29 |

The criteria for all these substrates is a peel strength of ≥0.26 (N/mm).

No primers were used in the peel adhesion testing. When trying to peel the membranes of substrates the failure is typically cohesive (the bond with the spun-bond base layer is stronger than the bond between the spun-bond and the melt-blown or microporous film layer).

Example 2

An alternative adhesive composition comprises the same mixture of components as the mixture described above in Example 1 except that component 4, the tackifier (xylene resin) is replaced with polyoxypropylene glycol. The alternative example composition therefore comprises the following components, 1 to 4, (Available from VIGteQnos Co Ltd of Japan) in the ratio 100:15:2.5:2 by weight:
1. AR-2412 Two component cross linked acrylic pressure sensitive adhesive.
  Acrylic ester copolymer (39%)
  Hydrogenerated rhodine ester resin (10%)
  Acetic ether (ethyl acetate) (50%)
  Vinyl acetate (1%)
2. AR-739M
  Water-absorbent resin (1%)
  Polypropylene glycol (1%)
  Water (98%)
3. HD-739D
  Modified polyisocyanate (20-25%)
  Silicon dioxide (5-10%)
  Toluene (50-55%)
  Acetic ether (ethyl acetate) (15-20%)
4. PP-4000
  Polyoxypropylene glycol (100%)

This mixture provides comparable or better results to that of Example 1, even when a thinner coating of 70 microns of the adhesive is applied to the permeable membrane. Water vapour permeability testing (Dry Cup) for a Wrapshield® product coated with a 70 micron layer of this adhesive (using the JIS L 1099(A-1 method)) gave a result of 4080 g/m²/24 hr. This is comparable with the results of example 1 but this high level of vapour permeability is achieved using a thinner (70 micron) layer of adhesive. By comparison the base (Wrapshield®) product had a mean permeability in this same test of 4637 g/m²/24 hr.

Peel adhesion testing of this material (under the same regime as in Table 4 above) was carried out on two substrates, stainless steel and DensGlas™ (gypsum and fibreglass sheathing). For stainless steel as substrate the mean peel strength was found to be 0.46 N/mm and for DensGlas™ 0.47 N/mm.

The results for Examples 1 and 2 illustrate the versatility and strength of the adhesives employed, showing that membranes of the invention are suitable for 'peel and stick' use in demanding construction applications.

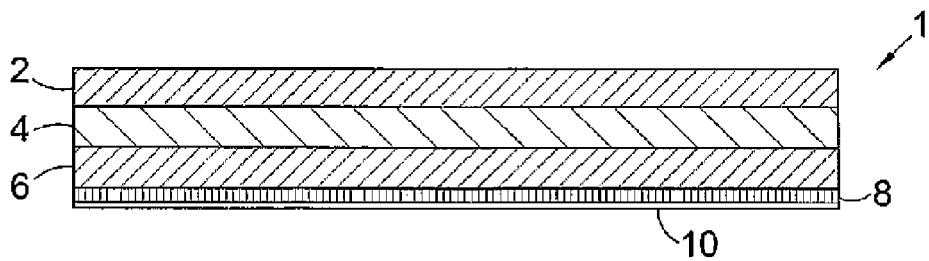

The invention claimed is:

1. A self-adhesive construction membrane sheet comprising a continuous layer of an air and water vapour permeable pressure sensitive adhesive attached to one surface of a permeable membrane sheet, wherein the permeable membrane sheet is:
a water vapour permeable air barrier laminated construction membrane comprising three layers: a spunbond polypropylene layer, a microporous polypropylene film layer and a spunbond polypropylene layer, wherein the adhesive mixture used to form the continuous layer of an air and water vapour permeable pressure sensitive adhesive comprises, before drying or curing:
an acrylic pressure sensitive adhesive as base compound;
an air permeable agent;
a cross-linking agent; and
polypropylene glycol;
so as to provide, after drying or curing, the continuous layer of air and water vapour permeable pressure sensitive adhesive having tortuous air permeable paths therethrough.

2. The self-adhesive construction membrane sheet according to claim 1 wherein the continuous layer of an air and water vapour permeable pressure sensitive adhesive is from 30 to 100 microns thickness.

3. The self-adhesive construction membrane sheet according to claim 1 wherein the water vapour permeability of the continuous layer of an air and water vapour permeable adhesive is 50 perms or more.

4. The self-adhesive construction membrane sheet according to claim 1 wherein the self-adhesive construction membrane sheet maintains more than 70 percent of the water vapour permeability of the permeable membrane sheet.

* * * * *

UNITED STATES PATENT AND TRADEMARK OFFICE
CERTIFICATE OF CORRECTION

PATENT NO.        : 9,562,174 B2
APPLICATION NO.   : 12/937823
DATED             : February 7, 2017
INVENTOR(S)       : Andrew Russell It is certified that error appears in the above-identified patent and that said Letters Patent is hereby corrected as shown below:

Replace the Title Page with the attached Title Page showing the corrected number of claims Column 12, Line 24, Add Claim 5:
5. The self-adhesive construction membrane sheet according to claim 1 wherein both surfaces of the permeable membrane sheet are supplied with the continuous layer of an air and water vapour permeable pressure sensitive adhesive."

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)

(12) United States Patent
Russell

(10) Patent No.: US 9,562,174 B2
(45) Date of Patent: Feb. 7, 2017

(54) ADHESIVE MEMBRANE

(75) Inventor: Andrew Russell, Sydney (AU)

(73) Assignee: A. Proctor Group Limited (GB)

(*) Notice: Subject to any disclaimer, the term of this patent is extended or adjusted under 35 U.S.C. 154(b) by 1048 days.

(21) Appl. No.: 12/937,823

(22) PCT Filed: Apr. 14, 2009

(86) PCT No.: PCT/GB2009/000962
§ 371 (c)(1),
(2), (4) Date: Apr. 15, 2011

(87) PCT Pub. No.: WO2009/127819
PCT Pub. Date: Oct. 22, 2009

(65) Prior Publication Data
US 2011/0185666 A1 Aug. 4, 2011

(30) Foreign Application Priority Data
Apr. 14, 2008 (GB) .................. 0806731.6

(51) Int. Cl.
B32B 7/12 (2006.01)
C09J 7/02 (2006.01)
(Continued)

(52) U.S. Cl.
CPC .............. *C09J 7/0296* (2013.01); *B32B 3/266* (2013.01); *B32B 5/022* (2013.01); *B32B 5/024* (2013.01); *B32B 7/06* (2013.01); *B32B 7/12* (2013.01); *B32B 23/06* (2013.01); *B32B 23/08* (2013.01); *B32B 27/08* (2013.01); *B32B 27/10* (2013.01); *B32B 27/12* (2013.01); *B32B 27/18* (2013.01); *B32B 27/32* (2013.01); *B32B 27/36* (2013.01); *B32B 27/40* (2013.01); *B32B 29/02* (2013.01); *C09J 7/0207* (2013.01); *E04D 12/002* (2013.01); *B32B 2255/10* (2013.01);
(Continued)

(58) Field of Classification Search
CPC .................................................. E04D 12/00
See application file for complete search history.

(56) References Cited

U.S. PATENT DOCUMENTS

RE24,906 E 12/1960 Ulrich
3,389,827 A 6/1968 Abere et al.
(Continued)

FOREIGN PATENT DOCUMENTS

EP 0306818 A2 * 3/1989 ............ D06N 7/00
EP 0397554 B1 3/1994
(Continued)

OTHER PUBLICATIONS

"Hardening Organic Polymer, Process for Producing the Same, and Hardening Composition Containing the Polymer", machine translation of WO2008053875A1 from Espacenet. Aug. 5, 2008.*
(Continued)

*Primary Examiner* — Anish Desai
(74) *Attorney, Agent, or Firm* — Dinsmore & Shohl LLP

(57) ABSTRACT

A self-adhesive permeable membrane sheet (1), for use in a building structure, includes a continuous layer of a permeable pressure sensitive adhesive (8) attached to one surface of a permeable membrane sheet (2,4,6). Methods for using the permeable membrane sheet (1) in construction are also provided.

5 Claims, 1 Drawing Sheet